US012705042B2

(12) United States Patent
Eberlein et al.

(10) Patent No.: US 12,705,042 B2
(45) Date of Patent: Aug. 11, 2026

(54) REVOKING A SOFTWARE SYSTEM UPGRADE WITHOUT DATA LOSS

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 553 days.

(21) Appl. No.: 18/327,370

(22) Filed: Jun. 1, 2023

(65) Prior Publication Data

US 2024/0403024 A1 Dec. 5, 2024

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC .................................... G06F 8/65; G06F 8/71
See application file for complete search history.

(56) References Cited

U.S. PATENT DOCUMENTS 8,972,934 B2 3/2015 Driesen et al.
9,058,371 B2 * 6/2015 Thomsen ................ G06F 16/27
9,361,093 B2 6/2016 Meissner et al.
10,146,675 B1 * 12/2018 Shemer ..................... G06F 8/71
10,303,665 B2 5/2019 Engelko et al.
2007/0180325 A1 * 8/2007 Bailey ..................... H04L 43/50 714/38.1
2010/0088281 A1 * 4/2010 Driesen ............... G06F 11/1433 707/E17.007
2012/0174085 A1 * 7/2012 Driesen ..................... G06F 8/65 717/168
2013/0238555 A1 * 9/2013 Driesen ................... G06F 16/13 707/613
2013/0238868 A1 * 9/2013 Driesen ................... G06F 16/13 711/162
2015/0007159 A1 * 1/2015 Gebhard ................. G06F 11/36 717/171
2015/0293820 A1 * 10/2015 Doshi ................... G06F 3/0644 711/162
2016/0364440 A1 * 12/2016 Lee ..................... G06F 11/1471
2017/0116335 A1 * 4/2017 Baby .......................... G06F 8/65
2018/0095953 A1 * 4/2018 Mayer ................... G06F 16/214
2018/0246948 A1 * 8/2018 Florendo ............. G06F 16/2455
2018/0336022 A1 * 11/2018 Eberlein ................... G06F 8/71
2020/0042298 A1 * 2/2020 Jain ........................... G06F 8/71
2020/0250176 A1 * 8/2020 Padmanabhan ....... H04L 9/3239
2020/0310925 A1 * 10/2020 Kottler ................ G06F 11/1471
2021/0279047 A1 * 9/2021 McLaren ............ G06F 11/3698
(Continued)

*Primary Examiner* — Lewis A Bullock, Jr.
*Assistant Examiner* — Theodore E Hebert
(74) *Attorney, Agent, or Firm* — Fish & Richardson P.C.

(57) ABSTRACT

A verification of an upgraded software system is determined to be unsuccessful. A recording of inbound and outbound calls is stopped in the upgraded software system. Following a roll back of the upgraded software system, starting a previous software system version is started. Inbound external communications are temporarily blocked for the previous software system version. Outbound external communication are redirected. The recording is replayed to re-create data in the previous software system version. External communication requests are replied to with responses from the recording. Number ranges for are checked completeness.

21 Claims, 8 Drawing Sheets

(56) References Cited

U.S. PATENT DOCUMENTS

| | | | | |
|---|---|---|---|---|
| 2021/0303421 | A1* | 9/2021 | Roterring | G06F 11/2097 |
| 2022/0046036 | A1* | 2/2022 | Bastawala | G06F 11/3006 |
| 2023/0185701 | A1* | 6/2023 | Liu | G06N 5/04<br>717/126 |
| 2024/0111510 | A1* | 4/2024 | Pandamaneti | G06F 8/65 |

* cited by examiner

100b

REVOKING A SOFTWARE SYSTEM UPGRADE WITHOUT DATA LOSS

BACKGROUND

Non-availability ("downtime") of a software application ("application" or "app") typically presents problems for software application users. In cases where software systems run mission critical software, downtime of a software application or software system can lead to unacceptable delays in important processes. In some instances, software system owner activities must be halted or can only continue to run for a certain period of time without the software application being made available. Therefore, downtime should be made as short as possible.

While there are several conventional concepts available to reduce "technical downtime" to zero time, there are additional tasks run by customer information technology (IT) administrators during a move from an old software application version to a new software application version, which lead to general "downtime." Mainly the IT tasks are performed to ensure that critical problems with the new software application version are found before the software application is used by too many users. While there are also processes to revoke an upgrade before users are switched to use the new software application version, revoking an upgrade once the users are already using the new software version can lead to data loss (for example, in restoring a backup, typically there is no "undo" for the upgrade). Data loss is even more problematic than downtime in most cases, as it is very costly in time and other resources to resolve. As a result, software system owners wish to have ensured that the new software application version runs without major problems before users are directed to the new software application version.

SUMMARY

The present disclosure describes providing the ability to revoke a software system upgrade without data loss.

In an implementation, a computer-implemented method, comprises: determining that verification of an upgraded software system is unsuccessful; stopping a recording of inbound and outbound calls in the upgraded software system; following a roll back of the upgraded software system, starting a previous software system version; temporarily blocking inbound external communications for the previous software system version; redirecting outbound external communication; replaying the recording to re-create data in the previous software system version; replying to external communication requests with responses from the recording; and checking number ranges for completeness.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, the described approach permits opening an updated software system for general usage by all users instead of just a restricted set of users performing some test bookings after a software application upgrade to minimize downtime of the software system during an upgrade. Second, if a problem is found with the software system after the upgrade (for example, after a few hours of use), the software system can be restored to a status with the old software application version. Activities which had already been executed on the new software application version can then be "replayed" to mitigate data loss, which permits fast re-opening of the software system for use. Third, compared to a conventional approach to execute selected actions, manually revoke the selected actions, and to re-execute the selected actions later, the described approach automates the process and reduces manual effort and a risk of errors. Fourth, the automated process can be tested in upgrade test executions, therefore relying during a production upgrade on a fully automated and fully tested upgrade processes without manual steps.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1A:
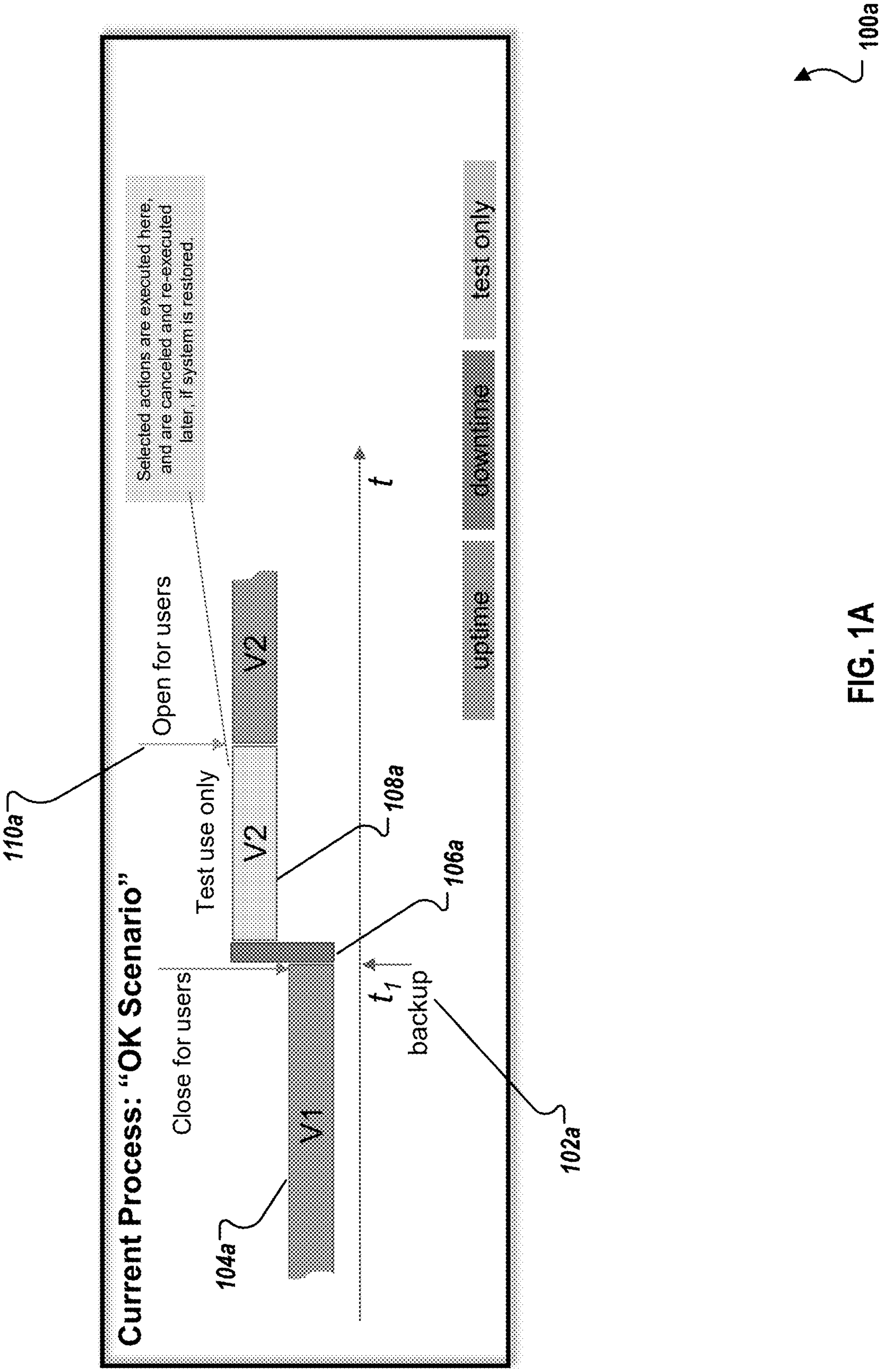
FIG. 1A is a time chart illustrating a current process "OK Scenario" to demonstrate downtime effects, according to an implementation of the present disclosure.

The following detailed description describes providing the ability to revoke a software system upgrade without data loss, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Non-availability ("downtime") of a software application ("application" or "app") typically presents problems for software application users. In cases where software systems (for example, on-premise customized software systems or cloud-computing-based software applications) run mission critical software, downtime of a software application or software system can lead to unacceptable delays in important processes. In some instances, software system owner activities must be halted or can only continue to run for a certain period of time without the software application being made available. Therefore, downtime should be made as short as possible.

In complex software systems, with user extensions and individual configurations, not all scenarios can be tested (that is, using a test system) before upgrade of a software application or testing tends to be very resource intensive (for example, integration testing with external communication partners). While there are several conventional concepts available to reduce "technical downtime" to near zero time, there are often additional tasks run by customer information technology (IT) administrators during a move from an old software application version to a new software application version, which lead to general "downtime."

For example, IT administrators can run a set of checks, before the software system is opened for general use by users. In some cases, the checks include: 1) (semi/manual) checks that a new software application configuration is a specified; 2) smoke tests (calling critical components to check that they work, and that performance is as expected); and 3) integration tests—especially with external communication partners. The integration tests typically include: "real data" and not "test data," but only for a very few data records, due to the complexity of a potential clean up if something goes wrong; 2) a data record is entered into the software system (for example, a user record is created), and a related user account process is executed, which results in calls to external software systems (responses are stored in the primary software system and may trigger further follow-up processes); 3) in case a severe error is detected, the IT administrators know the data entered and the communication performed with external software systems and can try and manually cancel or revoke the tasks triggered on the external software systems; 4) a backup is restored and the data is entered again, resulting again in calls to the external system, and performing the canceled activity again; and 5) once a corrected new software application version is available, the upgrade is re-tried.

Mainly the IT tasks are performed to ensure that critical problems with the new software application version are found before the software application is used by too many users. While there are also processes to revoke an upgrade before users are switched to use the new software application version, revoking an upgrade once the users are already using the new software version can lead to data loss (for example, in restoring a backup, typically there is no "undo" for the upgrade). Data loss is even more problematic than downtime in most cases, as it is very costly in time and other resources to resolve. As a result, software system owners wish to have ensured that the new software application version runs without major problems (that is, upgrade verification) before users are directed to the new software application version.

An alternative approach to mitigate this describe downtime is to set up a dedicated test landscape, which is costly—and not that telling and meaningful compared to a test in a real-world software system—as the test landscape typically cannot be fully integrated with all external communication partners. As a result, such tests are necessarily incomplete and some issues may be missed.

Users tend to define a "downtime" and verify a new software application version with some "exemplary bookings"—which can be manually revoked/cancelled and redone in case there is an issue. As previously mentioned, there is typically no controlled "undo" of an upgrade which keeps necessary software application data. Upgrades can only be undone and the old software system runs with software application data that only works for software systems with upward and downward compatible changes. The old software system should be graceful in handling new software application data, but software systems are typically not designed to do so.

Turning to FIG. 1A, FIG. 1A is a time chart 100*a* illustrating a current process "OK Scenario" to demonstrate downtime effects, according to an implementation of the present disclosure.

In a typical upgrade procedure, there is a point-in-time (here, t1 102*a*), when users are logged off from an old version of a software system/software application (V1 104*a*)—and at this point-in-time a database backup/snapshot 106*a* is performed. Some downtime tasks are executed. The software system is then opened running the new software application version (here, V2 at 108*a* for test-only). Only a restricted set of users are permitted to login to the software system for testing, to use the new software application version, and to create data. During this test-only period 108*a*, other users effectively experience a downtime. The total downtime experienced by some users is a combination of time required for both 106*a* and 108*a*. If no problem is found with the software system at some time in the test-only period 108*a*, the new software application version is opened for all users at 110*a*.

Figure 1B:
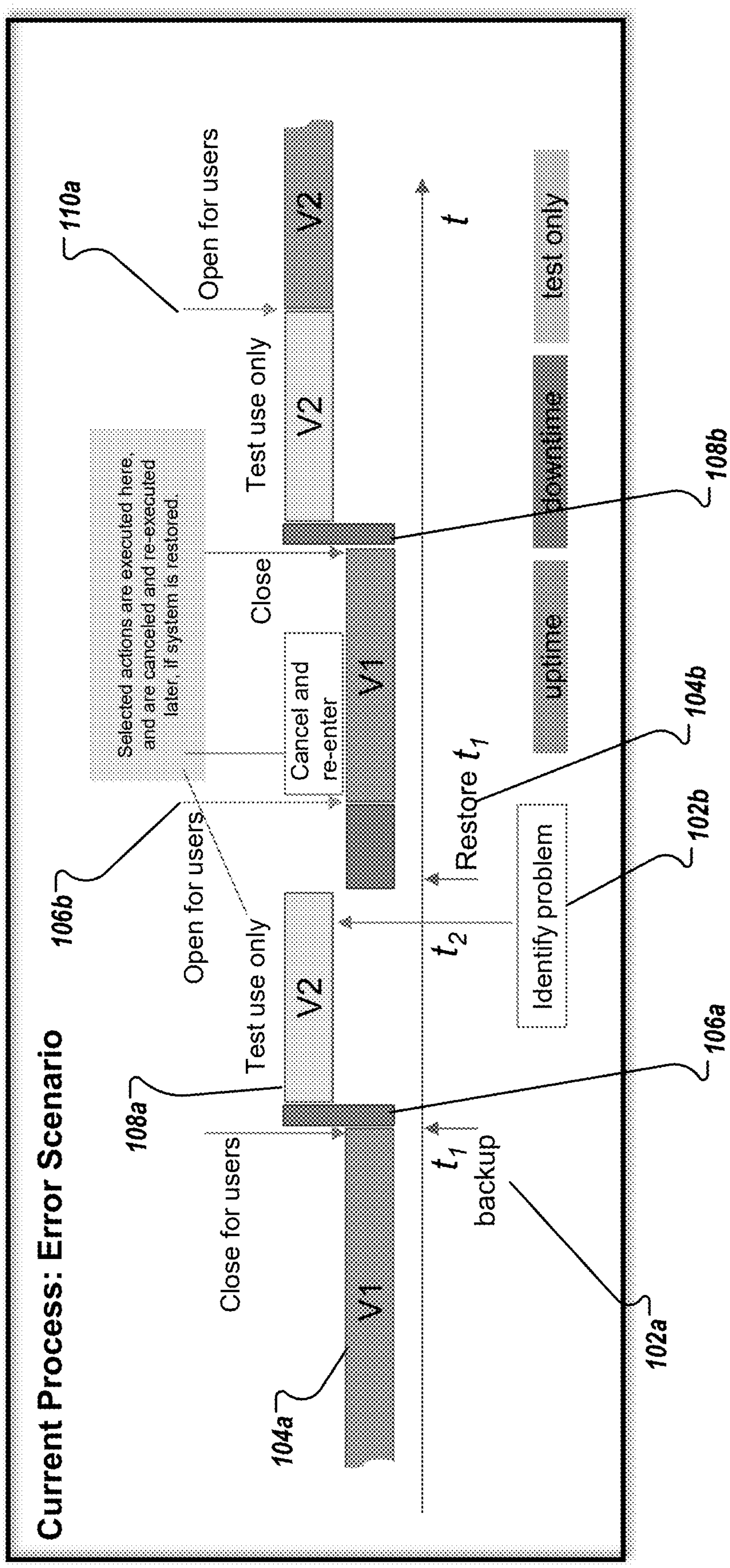
FIG. 1B is a time chart illustrating a current process "Error Scenario" to demonstrate further increased downtime effects, according to an implementation of the present disclosure.

FIG. 1B is a time chart 100*b* illustrating a current process "Error Scenario" to demonstrate further increased downtime effects, according to an implementation of the present disclosure.

If a problem with the new software application version V2 is identified 102*b* in the test-only period 108*a*, the database backup/snapshot 106*a* is restored at 104*b*. Old software system version V1 is restored and opened for all users at 106*b*. Note that data previously entered by the restricted users is lost. Similarly, if external systems call into the upgraded software system, the incoming calls may have created data associated with an upgraded software application, so this data would also be lost. If the upgraded software system called an external system, it may also have stored information about the executed outbound call in a database to keep a reference to a follow-up processes started at the external system. This data would also be lost. Even more problematic, if the users attempt to re-enter data on the older software system once started from a backup, the user actions can trigger calls to external systems, and these calls are executed again-causing one or more duplicate requests to be sent, which will typically not be detected by an external system administrators and result in a re-triggered actions (leading to expended resources and manual work by the external system administrators to resolve).

The previously described process (from 102*a*-108*a*) can then be repeated starting at 108*b*. If no problems are found with the new software system version V2, the new software system version can be opened for all users at 110*a* as in FIG. 1A. Total downtime for at least some users would include time required for 106*a*. 108*a*, 104*b*, and repeat time for actions similar to 106*a* and 108*a*.

Note that the "OK Scenario" of FIG. 1A can also be considered to be the second upgrade attempt visualized FIG. 1B.

The following describes an approach permitting upgrade verification and reduction of downtime in a complex software system. Revocation of a software system upgrade that has not been fully tested in advance can be performed on discovery of a critical issue and without data loss, particularly where users are actively using the complex software system.

Figure 2A:
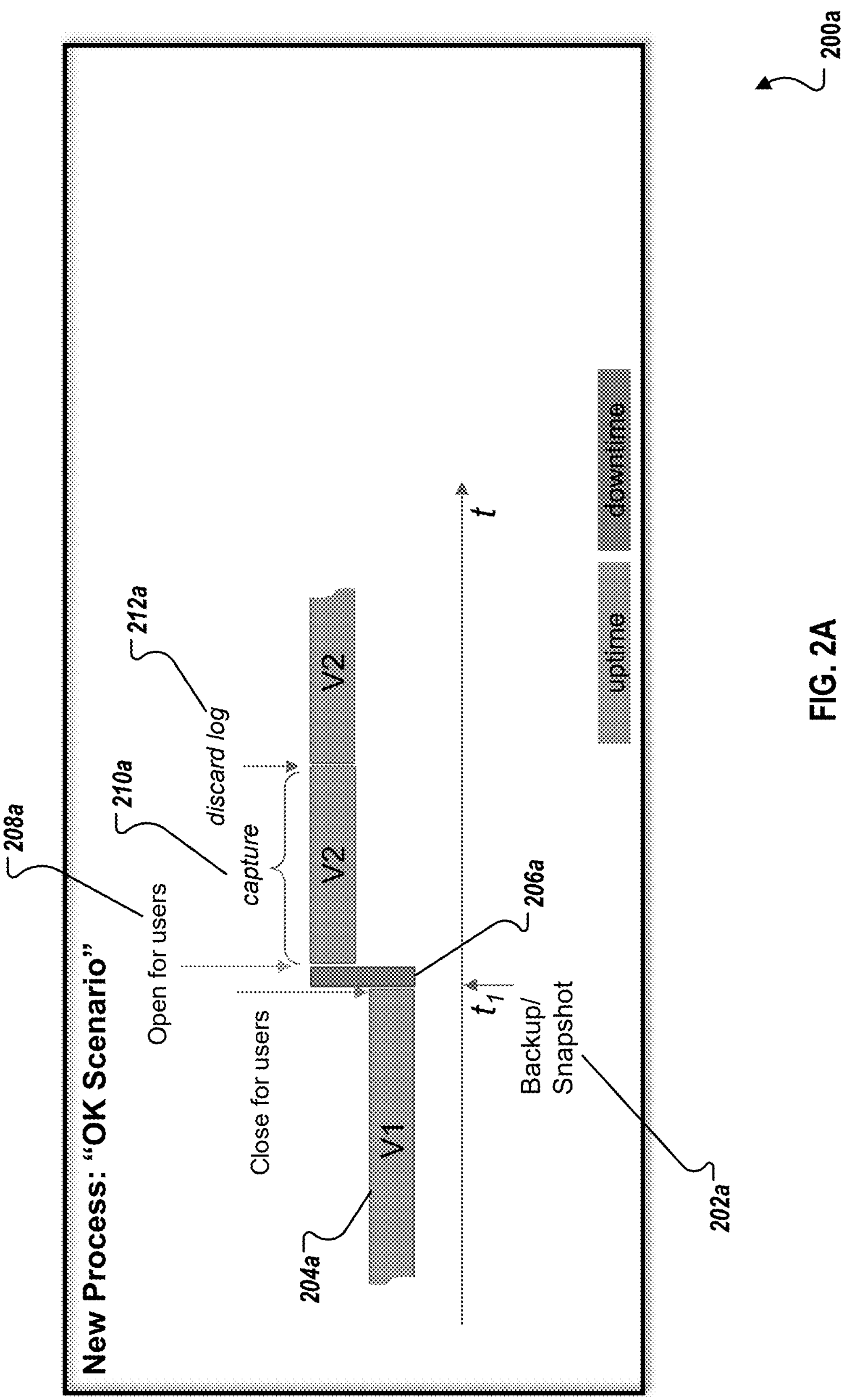
FIG. 2A is a time chart illustrating a new process "OK Scenario" to demonstrate reduced downtime effects, according to an implementation of the present disclosure.

FIG. 2A is a time chart 200*a* illustrating a new process "OK Scenario" to demonstrate reduced downtime effects, according to an implementation of the present disclosure.

In a typical upgrade procedure, there is a point-in-time (here, t1 202*a*), when users are logged off from an old version of a software system/software application (V1 204*a*)—and at this point-in-time a database backup/snapshot 206*a* is performed. Starting at 208*a*, the software system is then opened running the new software application version (here, V2) for all users. During 210*a*, data capture occurs.

At a high-level, the described approach includes three aspects: 1) capture of in- and outgoing traffic to a software system (both from users and system-to-system), 2) replay of traffic and capture of traffic in a communication interceptor; and 3) a dynamic extension infrastructure, which can add additional required fields to storage and interfaces to overcome software application version incompatibilities. The dynamic infrastructure is used from the point-in-time when the users start using a software system after an upgrade (including an upgrade with downtime or a zero-downtime upgrade) (here starting at 208*a*) and usage is going to the new software application version). At 210*a*, user activities are recorded (as well as other inbound traffic) to allow replay of the activities if needed. All outbound calls to an external system are recorded to allow identifying calls (capturing data in the payload) and keeping track of corresponding responses to be able to replay the responses in the software system without actually calling the external system a second time.

If no problem is found with the software system by 212*a*, the captured data logs are discarded and the new software application version V2 continues for all users.

The total downtime experienced by all users is the time required for the database backup/snapshot 206*a*.

Figure 2B:
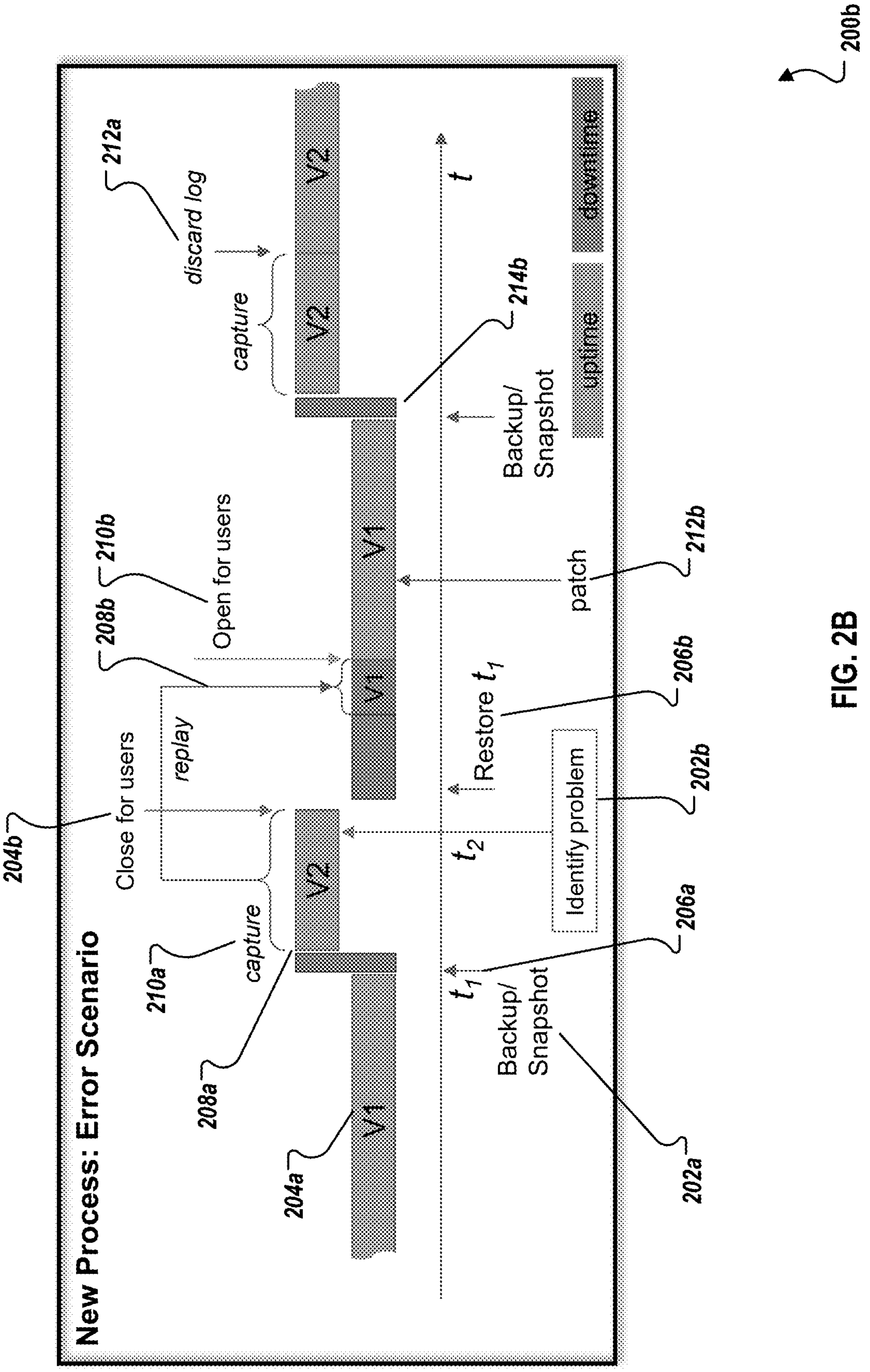
FIG. 2B is a time chart illustrating a new process "Error Scenario" to demonstrate reduced downtime effects, according to an implementation of the present disclosure.

FIG. 2B is a time chart 200*b* illustrating a new process "Error Scenario" to demonstrate reduced downtime effects, according to an implementation of the present disclosure.

When a software system is identified as having problem (at 202*b*) after an upgrade, the software system is closed for all users at 204*b*.

A backup/snapshot 206*a* of the software system still running the before-upgrade-version of the software application can be restored at 206*b*. Then, incoming traffic is replayed at 208*b*, creating data in the old software system (V1) again, which was created before (and which was lost due to the restored backup at 206*b*). In case used interfaces had been extended in the upgrade, additional data is captured in the system using generated extension fields. Since the software application will also generate field content (because not all fields are filled using a user interface), generated field content is added to the recording, to permit replay. This is especially useful for numbers consumed from number ranges, or unique identifiers (UIDs) used in external communication.

If outbound calls are triggered during the replay, the previously mentioned communication interceptor component identifies if the outbound calls had been prior-executed. If so, the communication interceptor component does not route the outbound calls to the external communication partner, but replies with the captured response of the earlier (recorded) outbound call. To identify a repeated outbound call and to map it to a recorded outbound call, sent data is analyzed, excluding, for example, data such as timestamps, which are to be expected to differ.

Once all incoming traffic has been re-played, the older software system is opened for usage. Then, the problem with the upgrade can be investigated, and the upgrade can later be continued with after any necessary repairs are completed, or the upgrade can be revoked and restarted at a later time.

At 212*b*, a patch to the original system is performed. In some implementations, problems which lead to a restore can include: 1) problem with software being deployed, so for a second try, an updated version of the software needs to be deployed (this is the typical case) and 2) a problem with the system and not with the new software, so the problem needs to be removed on the source system (typically this is performed by applying a patch). Note that the source system may be changed by customers, so their change may impact the upgrade, and to make the upgrade work, the change by the customer needs to be adjusted to make the upgrade work (included in the patch at 212*b*). The first problem is the more likely case.

At 214*b*, a database backup/snapshot similar to that in 206*a* is performed and actions similar to 208*a* and 210*a* are repeated. If the problem with the initial upgrade was due to the upgrade procedure or the deployed software, a new version of upgrade procedure can be used or a new version of the deployed software.

If no problem is found with the software system by 212*a*, the captured data logs are discarded and the new software application version V2 continues for all users.

The total downtime experienced by all users is the time required for the database backup/snapshot 206*a*, restore of the backup/snapshot 206*b*, reply 208*b*, and the additional database/snapshot at 214*b*.

Note that the "OK Scenario" of FIG. 2A can also be considered to be the second upgrade attempt visualized FIG. 2B.

Figure 3:
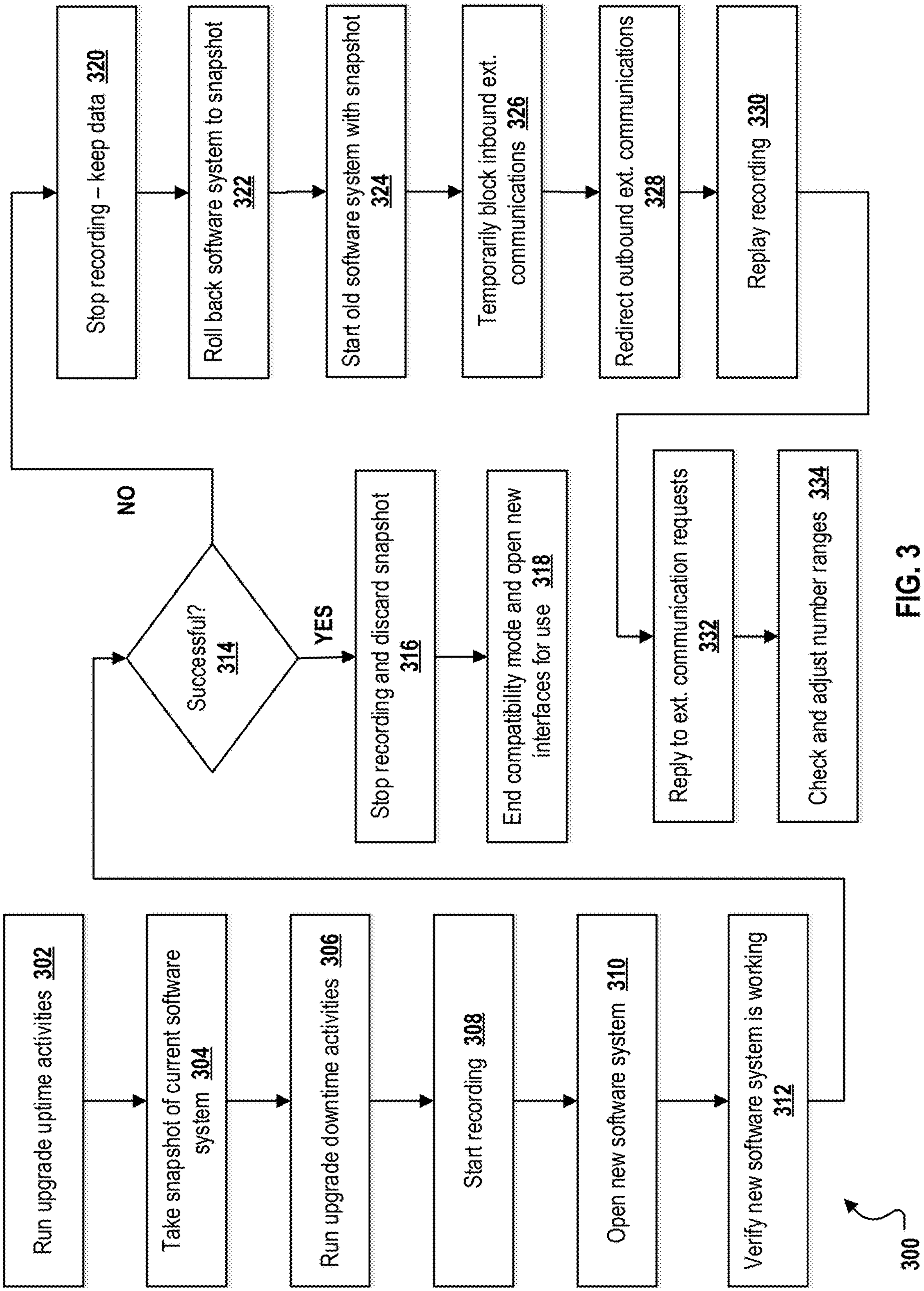
FIG. 3 is a flowchart illustrating an example of a computer-implemented method for providing the ability to revoke a software system upgrade without data loss, according to an implementation of the present disclosure.

Turning to FIG. 3, FIG. 3 is a flowchart illustrating an example of a computer-implemented method 300 for providing the ability to revoke a software system upgrade without data loss, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, upgrade uptime activities are run, until the upgrade goes to downtime or before users are switched to the new software system version in case of a zero-downtime maintenance (ZDM) upgrade. From 302, method 300 proceeds to 304

At 304, a backup/snapshot is taken of the current software system. From 304, method 300 proceeds to 306.

At 306, upgrade downtime activities are run (in case it is not a ZDM upgrade). From 306, method 300 proceeds to 308.

At 308, recording of inbound calls and outbound calls is started. The recorded data is stored in a second persistency, not part of the DB which will potentially be restored later. From 308, method 300 proceeds to 310.

At 310, the new software system version is opened for users. From 310, method 300 proceeds to 312.

At 312, working with the system, verify the new software system version is working. This can be in a compatibility mode, and new features that imply usage of new interfaces may not be yet allowed (for example, can be implemented by using feature toggles). From 312, method 300 proceeds to 314.

At 314, determine whether the new software system verification is successful. If the new software system version verification is successful, method 300 proceeds to 316. If the new software system version verification is not successful, method 300 proceeds to 320.

At 316, stop recording and discard the backup/snapshot. From 316, method 300 proceeds to 318.

At 318, end the compatibility mode and open new interfaces for usage. After 318, method 300 can stop.

At 320, stop recording (and keep the recorded data, the data must not be deleted upon a roll back to the backup/snapshot). From 320, method 300 proceeds to 322.

At 322, roll back the software system to the backup/snapshot. From 322, method 300 proceeds to 324.

At 324, start old software system version with the snapshot—this is running the start release software version. From 324, method 300 proceeds to 326.

At 326, temporarily block system for inbound external communications until recorded data was re-applied. From 326, method 300 proceeds to 328.

At 328, redirect outbound external communication to a Communication Interceptor. From 328, method 300 proceeds to 330.

At 330, replay recording, re-creating data in restored system (potentially capturing additional data for new version in extension fields). From 300, method 300 proceeds to 332.

At 332, reply to external communication requests with recorded responses. In some implementations, 330 and one or more of 332 and 334 can be considered to be a combined step. For example, during replay recording at 330, when an external communication happens, communication has been blocked and instead a recorded response is applied. From 332, method 300 proceeds to 334.

At 334, check the number ranges for completeness of the replay and adjust number ranges. In some implementations, 330 and one or more of 332 and 334 can be considered to be a combined step. For example, during replay recording at 330, if number ranges are used, the number ranges can be checked for completeness of the reply and adjusted if necessary. After 334, method 300 can stop.

In some implementations, after replay (for example, one or more of 330, 332, and 334) has finished, the following actions can be taken:

1) Discard recording.
2) Unblock inbound communication.
3) Cancel redirect of outbound external communication.
4) Continue working with restored system.
5) Retry upgrade, once fixed (the upgrade will keep the generated extension fields and the data captured there).

Unique Identifiers (UIDs)/Number Ranges

With respect to UIDs and number ranges, in some implementations, the problem can be addressed:

The generated UIDs and numbers during the recording are written together with the received data to the recording DB by extending the response interfaces with this data to enable external capturing.

When the database backup/snapshot is restored, the last issued numbers of the number range generators in the database are set back to the values, when the recording started.

When a call is replayed, a recorded UID or number is passed by extended request interfaces and written to the database tables of data objects. This write does not call a UID or number range generator directly to create a UID or number to be stored, as there could be deviations in the replay-sequence (as exactly "in-order" replay cannot be guaranteed).

For number ranges, in addition:

Since the number is written from a recorded value, the number range would not be adjusted to the consumed numbers.

The number range generator can be corrected like this: 1) the current highest number of the generator is read; 2) this value is compared with the number written; 3) if the read number is lower than the written number, the number generator is called to adjust the highest number to the written number; 4) if the read number is higher than the written number, the number generator is not called.

At the end of the replay, it is checked, if all recorded numbers have been consumed, and if the number generator next value is higher than the highest number stored in the recording.

New Field Names and Data Types Introduced by the New Software System Version

In some implementations, two primary alternatives are envisioned: 1) rely on "key user extensibility" infrastructure on the start release without configuration and 2) capture upgrade information on the new fields with the recording.

Rely on "key user extensibility" infrastructure on the start release without configuration.

When a field is added to a table in the start release to store data recorded using the new software system version, the standard "key user extensibility" infrastructure is used to create an extension field for the database table.

The field will have a name in a dedicated key-user namespace to avoid name-clashes with fields created by the software vendor. The field type can be derived from the definition in the interface, typically a "longer" data type is used (for example, BIGINT instead of SHORT) to ensure, the captured data can be stored, one would typically not try and identify the minimal need. If the type cannot be derived and the input is in text form, the field will be created using a "string," for binary a large object (LOB) field can be used in the database.

This results in a need to migrate the data stored in the generated field to the field being created during the upgrade. The migration procedure will be generated as part of the upgrade procedure, reading metadata written by a Time Delayed Extension System (TDES) (see FIG. 5). In some implementations, a TDES inbound interface receiving data from another system (or another component in the same system) detects, that there are new fields or nodes in received data other than it is configured to map to internal data structures. The TDES inbound interface calls the TDES to add a container to a data object that data is currently mapped to. Data elements which cannot be mapped to existing data object fields are stored in "name-value" pairs for later use.

For example, in the interface, a new field "order-expiration-date" and dates such as "11 Jan. 2023" are passed. The field will be generated as an extension field during replay:

Name: "/KEYUSER/F1"

Type: DATE.

The field will be created by a repeated upgrade, transferring data captured in the extension field during:

Name: "ORDEXPDATE"

Type: DATETIME.

Capture upgrade information on the new fields with the recording.

In some implementations, this is the preferred approach. Since the upgrade can add new fields during the procedure, the upgrade can provide a list of the tables and newly created fields and types to the recoding module. Therefore, if a new application programming interface (API) uses a new field and writes to a new database table field, the recording can capture this action.

In this case, the fields and data types can be passed during the replay by extended request interfaces (for example, as additional metadata) and the fields can be created by an extensibility framework already with the correct names and types used by the target version of software. The upgrade can then determine that database tables already have correct structure and types and not attempt to add the fields again. This avoids migration from the generated fields to the target fields. The mapping between API and fields used there and database tables can be provided by an API owner, potentially it can be computed from programming model metadata.

Compatibility Considerations & Constraints

In some implementations, the described approach has some constraints regarding compatibility of a new software version brought by the upgrade and the old version. For example, the described approach cannot handle incompatible changes (such as, a re-designed business processes or re-designed persistency). Also in the new approach, new functionality cannot be recorded and stored accurately.

As a result, a "verification period" is defined. During the verification period, former functionality can be used and the system can be verified. The use of new functionality can be delayed (for example, by using feature toggles on a graphical user interface (GUI), where:

- If an interface is new to the target software version, it could not be replayed to the old software version. The use of new interfaces is disabled using a feature-toggle and switched on at a later time, so recording and replay calls to such interfaces to not have to be performed.
- If a process triggers an additional step with the target software, (for example, a changed workflow or process step) the change is also disabled using a feature-toggle during the verification period and switched on at a later time, so the additional step does not have to be executed during replay (which would not be possible, as the implementation of the additional step does not exist in the older software version).

In this way, introduction of new offerings can be postponed to after the verification period. In fact, this is not really "downtime" but rather a "later introduction," so it does not conflict with user goals.

Figure 4:
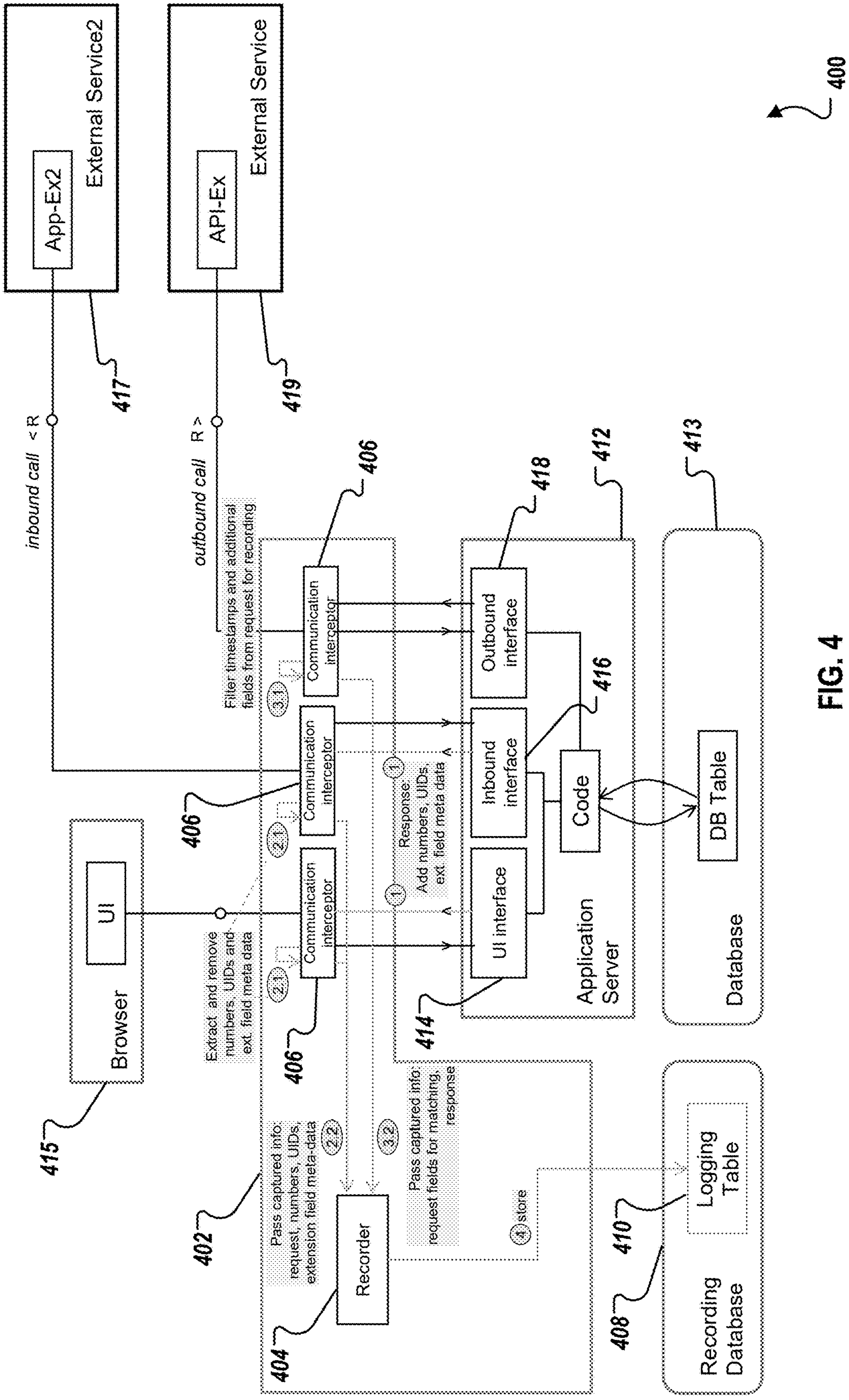
FIG. 4 is a block diagram of a system for providing an ability to revoke a software system upgrade without data loss—during recording functionality, according to an implementation of the present disclosure.

FIG. 4 is a block diagram of a system 400 for providing an ability to revoke a software system upgrade without data loss—during recording functionality, according to an implementation of the present disclosure.

A communication record/replay module 402 includes a recorder 404 and communication interceptor(s) 406. A recording database 408 includes a logging table 410. An application server 412 includes an associated database 413, user interface (UI) interface 414, inbound interface 416, and outbound interface 418. The user interface 414 and the inbound interface 416 can hand over the additional data to the TDES, specifying an interface id and data object id.

The communication record/replay module 402/Recorder 404 records inbound requests using the UI interface 414 (for example, from a browser/UI 415) or inbound interface 416 (for example, from an external service 417).

The inbound requests recorded include the called interface and the passed data (including authentication data). In some cases, the recording can include a response interface extension (not illustrated) to also capture data generated internally to store together with the incoming data (for example, created UIDs or numbers from a number range, which this eliminates the need for a guaranteed replay-in-order. This data is added to the response to the inbound communication. The additional information is captured there by the recorder 404 and removed from the actual response forwarded to the ultimate receiver). In some cases, if an upgrade adds a field to a data object, database tables, and the interface, this meta-data information can be recorded, and creation of an extension can be optimized with the captured information.

The communication record/replay module 402/Recorder 404 records outbound calls (for example, calls using the outbound interface 418, associated communication interceptor 406, and to external service 419). The outbound calls recorded include the called interface and address, the sent data, and a received response. Note that in some cases, time stamps are filtered out, which might be different. Optionally, a list of fields can be specified to be excluded from signature matching.

At (1), a response can include internally generated data to store together with incoming data (for example, created UIDs or numbers from a number range, and extension field metadata, which is added to the response to the inbound communication.

At (2.1), numbers, unique identifiers (UID), extension field metadata are extracted and removed from an inbound request.

At (2.2), the captured information from the inbound request (for example, request, numbers, UIDs, and extension field metadata) is passed to the recorder.

At (3.1), timestamps and additional fields are stripped from an outbound request for recording.

At (3.2), the captured information from the outbound request (for example, request fields for matching and response) is passed to the recorder 404.

At (4), the recorder 404 stores the data into the logging table 410 of the recording database 408.

Figure 5:
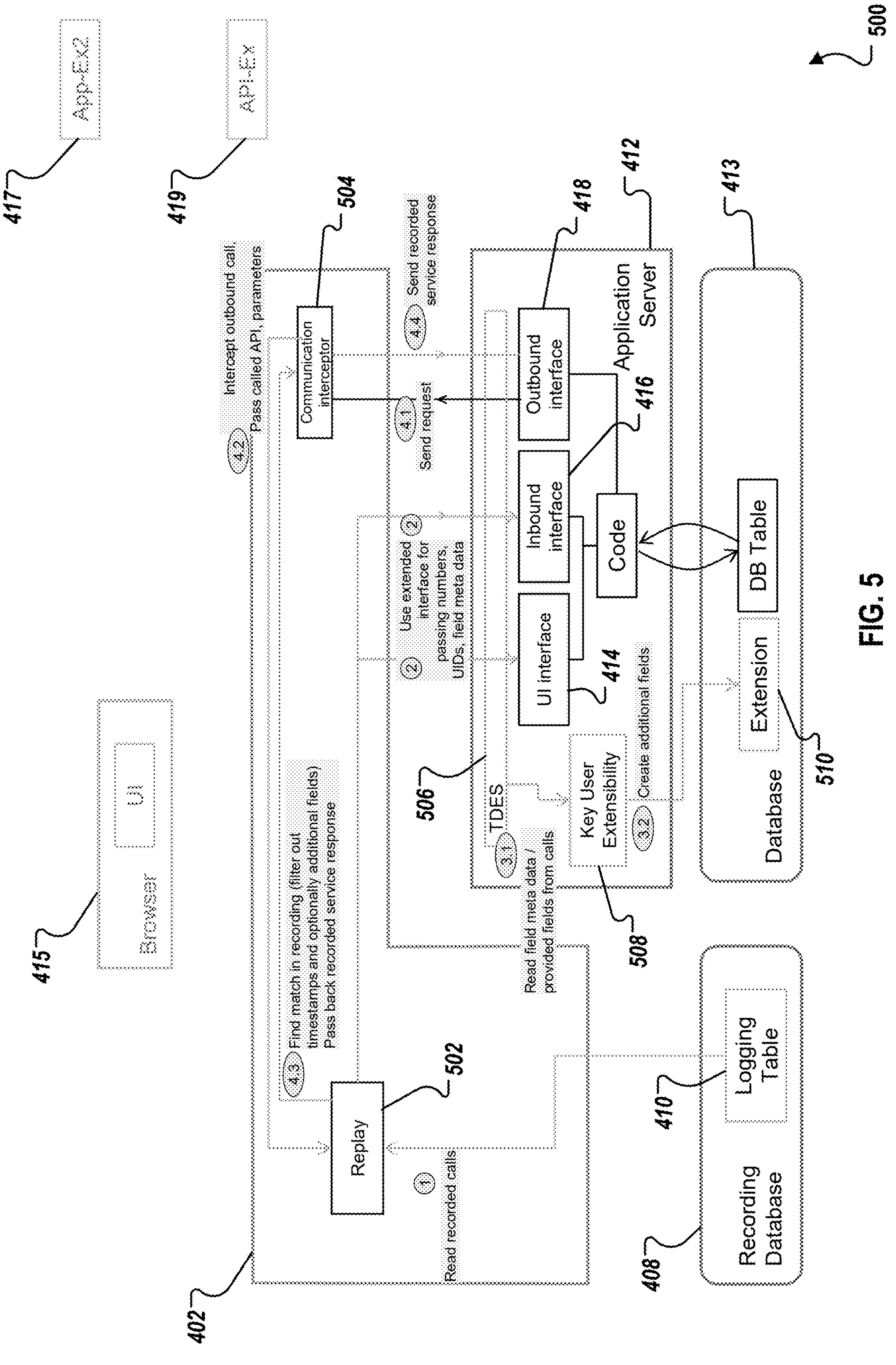
FIG. 5 is a block diagram of a system for providing an ability to revoke a software system upgrade without data loss—during replay functionality, according to an implementation of the present disclosure.

FIG. 5 is a block diagram of a system 500 for providing an ability to revoke a software system upgrade without data loss—during replay functionality, according to an implementation of the present disclosure.

A communication record/replay module 402 includes a component for replay 502 and an associated communication interceptor(s) 504 (for example, similar to communication interceptor 406 of FIG. 4). The application server 412 includes a TDES 506 and key user extensibility 508 and a database extension 510 for storing additional fields that is associated with database 413.

During replay of recorded calls, the appropriate interface is used to fill the recorded data. In some cases, an interface-variant can be used, which permits providing captured additional data that is usually created internally, but now provided from the recording as well as the meta-data for new fields and their data types. Outbound calls are captured during replay using the communication interceptor 504. If an outbound call matches a signature of a recorded call, do not send, but reply with captured response. The match of the signature of the recorded call is performed for filtered values only (for example, excluding timestamps). Developers can extend a list of additional fields to be filtered out (for example, generated numbers for communication purposes, such as technical UIDs).

In checking operations, a check is performed to determine if all recorded numbers have been used & forwarded to the highest target. A consistency check is performed. A number range generator is configured to correctly provide correct next numbers.

As previously described, a dynamic input API and data object field structure is provided (TDES) 506. Calls to interface versions are captured, which are part of a new software version of a system. Using TDES 506, the interfaces and database table fields will again be available when an upgrade is re-executed. The extension fields are automatically created (for example, without user interaction) using key user extensibility 508 and stored in extension table(s) 510 in database 413. With the information about a data object id, the TDES 506 creates storage for the extension data in a generic form (for example, key-value pairs and a reference to the respective data object instance).

Since the extension fields are created during the upgrade with the target name and data type, the information is captured with the recording (for example, see FIG. 4), and TDES 506 can be configured with this information to create a field with a correct name and type when an upgrade is performed again. The generated fields will map to fields usually created in a target software version during an upgrade. In case of a re-execution of the upgrade, the upgrade will determine, that the field already exists in database 413/extension 510 and not create it again. In some cases, annotation information in TDES 506 can support the upgrade in identifying this situation.

At (1), recorded calls are read by replay 502 from the logging table 410 in recording database 408.

At (2), an extended interface is used for passing numbers, UIDs, and field metadata.

At (3.1), field metadata/provided fields from calls are read by TDES 506 from key user extensibility 508.

At (3.2), key user extensibility 302 creates additional field using data from the extension table(s) 510 in database 413.

At (4.1), a request is sent using the outbound interface 418 and intercepted by the communication interceptor 504.

At (4.2), the communication interceptor 504 intercepts the outbound call and passes the called API and parameters to replay 502.

At (4.3), replay 502 finds a match in the recording data and passes back the recorded service response to the communication interceptor 504 to respond to the request from (4.1). Note that timestamps and optionally indicated fields are filtered out.

In some implementations, various software components can be configured to perform one or more of the following functionalities. The various software components can be independent or associated with one or more of the previously described system or software components, as will be appreciated by those of ordinary skill in the art.

Configuring an inbound service to store additional data generically: For subsequent calls, additional data can be stored in the extension 510.

Pre-configuring extensibility: Called if a user chooses to transform additional fields into an extension. A data object id can be specified to be extended, the technical field name, the technical field type and optionally a field identifier, which permits mapping the extension to an extended version of the data object.

"Data mapping" inbound "additional fields" to extensibility: In a case where a user creates an extension, the inbound interface can be configured to map the additional field to the created extension.

For an upgrade, mapping generic storage on new fields: TDES 506 can be called in an upgrade. Generically stored fields are compared to new fields brought with the upgrade. If an automatic mapping is possible (for example, based on identifiers) this functionality can be performed. If not automatic, a user task can be created.

Creating key-user tasks: A task can be created in the system for a key user that is assigned to a particular role (for example, "extensibility"). The task can contain information about additional fields, options offered, and a mechanism for initiating an extension.

Configuring outbound interfaces: For an extended data object, outbound interfaces are identified, which use the data object. The outbound interface is configured to add the additionally stored fields in the outgoing messages. In this way, a process can be established, where (for example, three systems are involved), a process flow is from system one to two to three and only systems one and three had been upgraded to contain a data object of a new version. System two initially not having these new fields is now passing data through and the process can even work with system two still on the old release.

Call the TDES 506: In case new fields/additional fields compared to the interface definition are contained in the message, the inbound interface calls the TDES 506 interface for "inbound interfaces" (for example, inbound interface 416) and passes required information (for example, the interface id, the data object id, and the field information).

Forward data to generic container: If configured, at each incoming call to the inbound interface 416, a data object in the generic extension 510 stores the additional data.

Forward data to extension fields: If configured, at each incoming call to the inbound interface 416, the additional data is stored in the extension 510.

Enrich data in messages by extensions: If configured, a data object adds extension data (for example, stored generically or in extension 510) to the message in the outbound interface 418.

Figure 6:
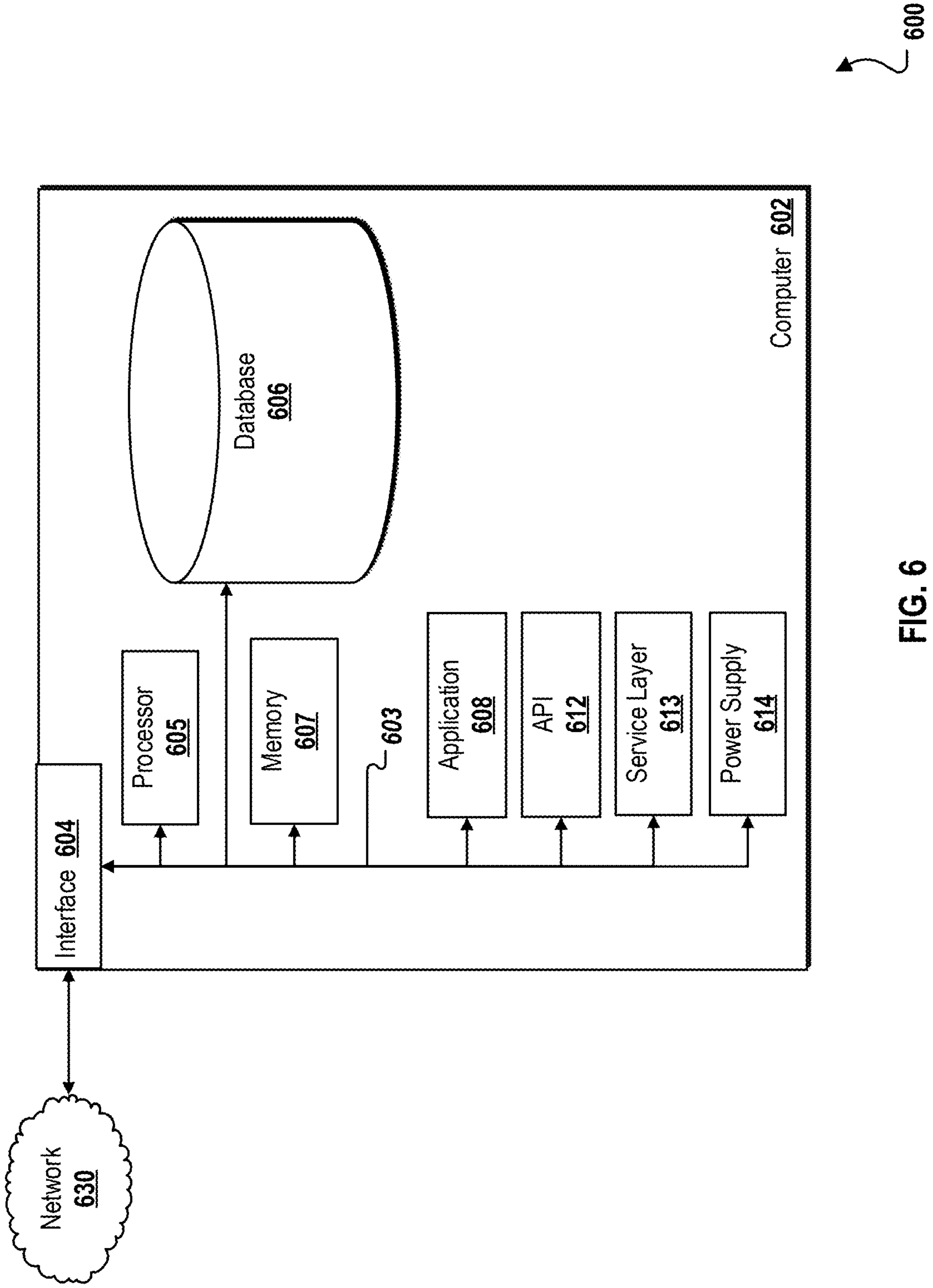
FIG. 6 is a block diagram illustrating an example of a computer-implemented system used to provide computational functionalities associated with described algorithms, methods, functions, processes, flows, and procedures, according to an implementation of the present disclosure.

FIG. 6 is a block diagram illustrating an example of a computer-implemented System 600 used to provide computational functionalities associated with described algorithms, methods, functions, processes, flows, and procedures, according to an implementation of the present disclosure. In the illustrated implementation. System 600 includes a Computer 602 and a Network 630.

The illustrated Computer 602 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 602 can include an input device, such as a keypad, keyboard, or touch screen, or a combination of input devices that can accept user information, and an output device that conveys information associated with the operation of the Computer 602, including digital data, visual, audio, another type of information, or a combination of types of information, on a graphical-type user interface (UI) (or GUI) or other UI.

The Computer 602 can serve in a role in a distributed computing system as, for example, a client, network component, a server, or a database or another persistency, or a combination of roles for performing the subject matter described in the present disclosure. The illustrated Computer 602 is communicably coupled with a Network 630. In some implementations, one or more components of the Computer 602 can be configured to operate within an environment, or a combination of environments, including cloud-computing, local, or global.

At a high level, the Computer 602 is an electronic computing device operable to receive, transmit, process, store, or manage data and information associated with the described subject matter. According to some implementations, the Computer 602 can also include or be communicably coupled with a server, such as an application server, e-mail server, web server, caching server, or streaming data server, or a combination of servers.

The Computer 602 can receive requests over Network 630 (for example, from a client software application executing on another Computer 602) and respond to the received requests by processing the received requests using a software application or a combination of software applications. In addition, requests can also be sent to the Computer 602 from internal users (for example, from a command console or by another internal access method), external or third-parties, or other entities, individuals, systems, or computers.

Each of the components of the Computer 602 can communicate using a System Bus 603. In some implementations, any or all of the components of the Computer 602, including hardware, software, or a combination of hardware and software, can interface over the System Bus 603 using an application programming interface (API) 612, a Service Layer 613, or a combination of the API 612 and Service Layer 613. The API 612 can include specifications for routines, data structures, and object classes. The API 612 can be either computer-language independent or dependent and refer to a complete interface, a single function, or even a set of APIs. The Service Layer 613 provides software services to the Computer 602 or other components (whether illustrated or not) that are communicably coupled to the Computer 602. The functionality of the Computer 602 can be accessible for all service consumers using the Service Layer 613. Software services, such as those provided by the Service Layer 613, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 602, alternative implementations can illustrate the API 612 or the Service Layer 613 as stand-alone components in relation to other components of the Computer 602 or other components (whether illustrated or not) that are communicably coupled to the Computer 602. Moreover, any or all parts of the API 612 or the Service Layer 613 can be implemented as a child or a sub-module of another software module, enterprise application, or hardware module without departing from the scope of the present disclosure.

The Computer 602 includes an Interface 604. Although illustrated as a single Interface 604, two or more Interfaces 604 can be used according to particular needs, desires, or particular implementations of the Computer 602. The Interface 604 is used by the Computer 602 for communicating with another computing system (whether illustrated or not) that is communicatively linked to the Network 630 in a distributed environment. Generally, the Interface 604 is operable to communicate with the Network 630 and includes logic encoded in software, hardware, or a combination of software and hardware. More specifically, the Interface 604 can include software supporting one or more communication protocols associated with communications such that the Network 630 or hardware of Interface 604 is operable to communicate physical signals within and outside of the illustrated Computer 602.

The Computer 602 includes a Processor 605. Although illustrated as a single Processor 605, two or more Processors 605 can be used according to particular needs, desires, or particular implementations of the Computer 602. Generally, the Processor 605 executes instructions and manipulates data to perform the operations of the Computer 602 and any algorithms, methods, functions, processes, flows, and procedures as described in the present disclosure.

The Computer 602 also includes a Database 606 that can hold data for the Computer 602, another component communicatively linked to the Network 630 (whether illustrated or not), or a combination of the Computer 602 and another component. For example, Database 606 can be an in-memory or conventional database storing data consistent with the present disclosure. In some implementations, Database 606 can be a combination of two or more different database types (for example, a hybrid in-memory and conventional database) according to particular needs, desires, or particular implementations of the Computer 602 and the described functionality. Although illustrated as a single Database 606, two or more databases of similar or differing types can be used according to particular needs, desires, or particular implementations of the Computer 602 and the described functionality. While Database 606 is illustrated as an integral component of the Computer 602, in alternative implementations, Database 606 can be external to the Computer 602. The Database 606 can hold and operate on at least any data type mentioned or any data type consistent with this disclosure.

The Computer 602 also includes a Memory 607 that can hold data for the Computer 602, another component or components communicatively linked to the Network 630 (whether illustrated or not), or a combination of the Computer 602 and another component. Memory 607 can store any data consistent with the present disclosure. In some implementations, Memory 607 can be a combination of two or more different types of memory (for example, a combination of semiconductor and magnetic storage) according to particular needs, desires, or particular implementations of the Computer 602 and the described functionality. Although illustrated as a single Memory 607, two or more Memories 607 or similar or differing types can be used according to particular needs, desires, or particular implementations of the Computer 602 and the described functionality. While Memory 607 is illustrated as an integral component of the Computer 602, in alternative implementations, Memory 607 can be external to the Computer 602.

The Application 608 is an algorithmic software engine providing functionality according to particular needs, desires, or particular implementations of the Computer 602, particularly with respect to functionality described in the present disclosure. For example, Application 608 can serve as one or more components, modules, or applications. Further, although illustrated as a single Application 608, the Application 608 can be implemented as multiple Applications 608 on the Computer 602. In addition, although illustrated as integral to the Computer 602, in alternative implementations, the Application 608 can be external to the Computer 602.

The Computer 602 can also include a Power Supply 614. The Power Supply 614 can include a rechargeable or non-rechargeable battery that can be configured to be either user- or non-user-replaceable. In some implementations, the Power Supply 614 can include power-conversion or management circuits (including recharging, standby, or another power management functionality). In some implementations, the Power Supply 614 can include a power plug to allow the Computer 602 to be plugged into a wall socket or another power source to, for example, power the Computer 602 or recharge a rechargeable battery.

There can be any number of Computers 602 associated with, or external to, a computer system containing Computer 602, each Computer 602 communicating over Network 630. Further, the term "client," "user," or other appropriate terminology can be used interchangeably, as appropriate, without departing from the scope of the present disclosure. Moreover, the present disclosure contemplates that many users can use one Computer 602, or that one user can use multiple computers 602.

Described implementations of the subject matter can include one or more features, alone or in combination.

For example, in a first implementation, a computer-implemented method, comprising: determining that verification of an upgraded software system is unsuccessful; stopping a recording of inbound and outbound calls in the upgraded software system; following a roll back of the upgraded software system, starting a previous software system version; temporarily blocking inbound external communications for the previous software system version; redirecting outbound external communication; replaying the recording to re-create data in the previous software system version; replying to external communication requests with responses from the recording; and checking number ranges for completeness.

The foregoing and other described implementations can each, optionally, include one or more of the following features:

A first feature, combinable with any of the following features, comprising: recording, as recorded data, inbound and outbound calls in the upgraded software system; and storing the recorded data in a persistency other than a database of the upgraded software system to potentially be restored.

A second feature, combinable with any of the previous or following features, comprising: rolling back the upgraded software system to the previous software system version using a previously stored snapshot.

A third feature, combinable with any of the previous or following features, wherein the inbound external communications are temporarily blocked until data in the previous software system version is recreated.

A fourth feature, combinable with any of the previous or following features, wherein the outbound external communication is redirected to a communication interceptor.

A fifth feature, combinable with any of the previous or following features, wherein replaying the recording to re-create data in the previous software system version, comprises: capturing additional data for the upgraded software system in extension fields.

A sixth feature, combinable with any of the previous or following features, comprising: if the number ranges are determined to be incomplete, adjusting the number ranges.

In a second implementation, a non-transitory, computer-readable medium storing one or more instructions executable by a computer system to perform operations, comprising: determining that verification of an upgraded software system is unsuccessful; stopping a recording of inbound and outbound calls in the upgraded software system; following a roll back of the upgraded software system, starting a previous software system version; temporarily blocking inbound external communications for the previous software system version; redirecting outbound external communication; replaying the recording to re-create data in the previous software system version; replying to external communication requests with responses from the recording; and checking number ranges for completeness.

The foregoing and other described implementations can each, optionally, include one or more of the following features:

A first feature, combinable with any of the following features, comprising: recording, as recorded data, inbound and outbound calls in the upgraded software system; and storing the recorded data in a persistency other than a database of the upgraded software system to potentially be restored.

A second feature, combinable with any of the previous or following features, comprising: rolling back the upgraded software system to the previous software system version using a previously stored snapshot.

A third feature, combinable with any of the previous or following features, wherein the inbound external communications are temporarily blocked until data in the previous software system version is recreated.

A fourth feature, combinable with any of the previous or following features, wherein the outbound external communication is redirected to a communication interceptor.

A fifth feature, combinable with any of the previous or following features, wherein replaying the recording to re-create data in the previous software system version, comprises: capturing additional data for the upgraded software system in extension fields.

A sixth feature, combinable with any of the previous or following features, comprising: if the number ranges are determined to be incomplete, adjusting the number ranges.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations, comprising: determining that verification of an upgraded software system is unsuccessful; stopping a recording of inbound and outbound calls in the upgraded software system; following a roll back of the upgraded software system, starting a previous software system version; temporarily blocking inbound external communications for the previous software system version; redirecting outbound external communication; replaying the recording to re-create data in the previous software system version; replying to external communication requests with responses from the recording; and checking number ranges for completeness.

The foregoing and other described implementations can each, optionally, include one or more of the following features:

A first feature, combinable with any of the following features, comprising: recording, as recorded data, inbound and outbound calls in the upgraded software system; and storing the recorded data in a persistency other than a database of the upgraded software system to potentially be restored.

A second feature, combinable with any of the previous or following features, comprising: rolling back the upgraded software system to the previous software system version using a previously stored snapshot.

A third feature, combinable with any of the previous or following features, wherein the inbound external communications are temporarily blocked until data in the previous software system version is recreated.

A fourth feature, combinable with any of the previous or following features, wherein the outbound external communication is redirected to a communication interceptor.

A fifth feature, combinable with any of the previous or following features, wherein replaying the recording to re-create data in the previous software system version, comprises: capturing additional data for the upgraded software system in extension fields.

A sixth feature, combinable with any of the previous or following features, comprising: if the number ranges are determined to be incomplete, adjusting the number ranges.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
- determining that verification of an upgraded software system is unsuccessful;
- stopping a recording of inbound and outbound calls in the upgraded software system;
- following a roll back of the upgraded software system, starting a previous software system version;
- temporarily blocking inbound external communications for the previous software system version;
- redirecting outbound external communication;
- replaying the recording of inbound calls, captured from the upgraded software system during the verification, into the started previous software system version to re-create data generated by the upgraded software system during the verification;
- replying to external communication requests with responses from the recording; and
- checking number ranges for completeness.

2. The computer-implemented method of claim 1, comprising:
- recording, as recorded data, inbound and outbound calls in the upgraded software system; and
- storing the recorded data in a persistency other than a database of the upgraded software system to potentially be restored.

3. The computer-implemented method of claim 1, comprising:
- rolling back the upgraded software system to the previous software system version using a previously stored snapshot.

4. The computer-implemented method of claim 1, wherein the inbound external communications are temporarily blocked until data in the previous software system version is recreated.

5. The computer-implemented method of claim 1, wherein the outbound external communication is redirected to a communication interceptor.

6. The computer-implemented method of claim 1, wherein replaying the recording to re-create data in the previous software system version, comprises:
- capturing additional data for the upgraded software system in extension fields.

7. The computer-implemented method of claim 1, comprising:
- if the number ranges are determined to be incomplete, adjusting the number ranges.

8. A non-transitory, computer-readable medium storing one or more instructions executable by a computer system to perform operations, comprising:
- determining that verification of an upgraded software system is unsuccessful;
- stopping a recording of inbound and outbound calls in the upgraded software system;
- following a roll back of the upgraded software system, starting a previous software system version;
- temporarily blocking inbound external communications for the previous software system version;
- redirecting outbound external communication;
- replaying the recording of inbound calls, captured from the upgraded software system during the verification, into the started previous software system version to re-create data generated by the upgraded software system during the verification;
- replying to external communication requests with responses from the recording; and
- checking number ranges for completeness.

9. The non-transitory, computer-readable medium of claim 8, comprising:
- recording, as recorded data, inbound and outbound calls in the upgraded software system; and
- storing the recorded data in a persistency other than a database of the upgraded software system to potentially be restored.

10. The non-transitory, computer-readable medium of claim 8, comprising:
- rolling back the upgraded software system to the previous software system version using a previously stored snapshot.

11. The non-transitory, computer-readable medium of claim 8, wherein the inbound external communications are temporarily blocked until data in the previous software system version is recreated.

12. The non-transitory, computer-readable medium of claim 8, wherein the outbound external communication is redirected to a communication interceptor.

13. The non-transitory, computer-readable medium of claim 8, wherein replaying the recording to re-create data in the previous software system version, comprises:
- capturing additional data for the upgraded software system in extension fields.

14. The non-transitory, computer-readable medium of claim 8, comprising:
- if the number ranges are determined to be incomplete, adjusting the number ranges.

15. A computer-implemented system, comprising:

one or more computers; and one or more computer memory devices interoperably coupled with the one or more computers and having tangible, non-transitory, machine-readable media storing one or more instructions that, when executed by the one or more computers, perform operations, comprising:

determining that verification of an upgraded software system is unsuccessful;

stopping a recording of inbound and outbound calls in the upgraded software system;

following a roll back of the upgraded software system, starting a previous software system version;

temporarily blocking inbound external communications for the previous software system version;

redirecting outbound external communication;

replaying the recording of inbound calls, captured from the upgraded software system during the verification, into the started previous software system version to re-create data generated by the upgraded software system during the verification;

replying to external communication requests with responses from the recording; and checking number ranges for completeness.

16. The computer-implemented system of claim 15, comprising:

recording, as recorded data, inbound and outbound calls in the upgraded software system; and storing the recorded data in a persistency other than a database of the upgraded software system to potentially be restored.

17. The computer-implemented system of claim 15, comprising:

rolling back the upgraded software system to the previous software system version using a previously stored snapshot.

18. The computer-implemented system of claim 15, wherein the inbound external communications are temporarily blocked until data in the previous software system version is recreated.

19. The computer-implemented system of claim 15, wherein the outbound external communication is redirected to a communication interceptor.

20. The computer-implemented system of claim 15, wherein replaying the recording to re-create data in the previous software system version, comprises:

capturing additional data for the upgraded software system in extension fields.

21. The computer-implemented system of claim 15, comprising:

if the number ranges are determined to be incomplete, adjusting the number ranges.

* * * * *